UNITED STATES PATENT OFFICE.

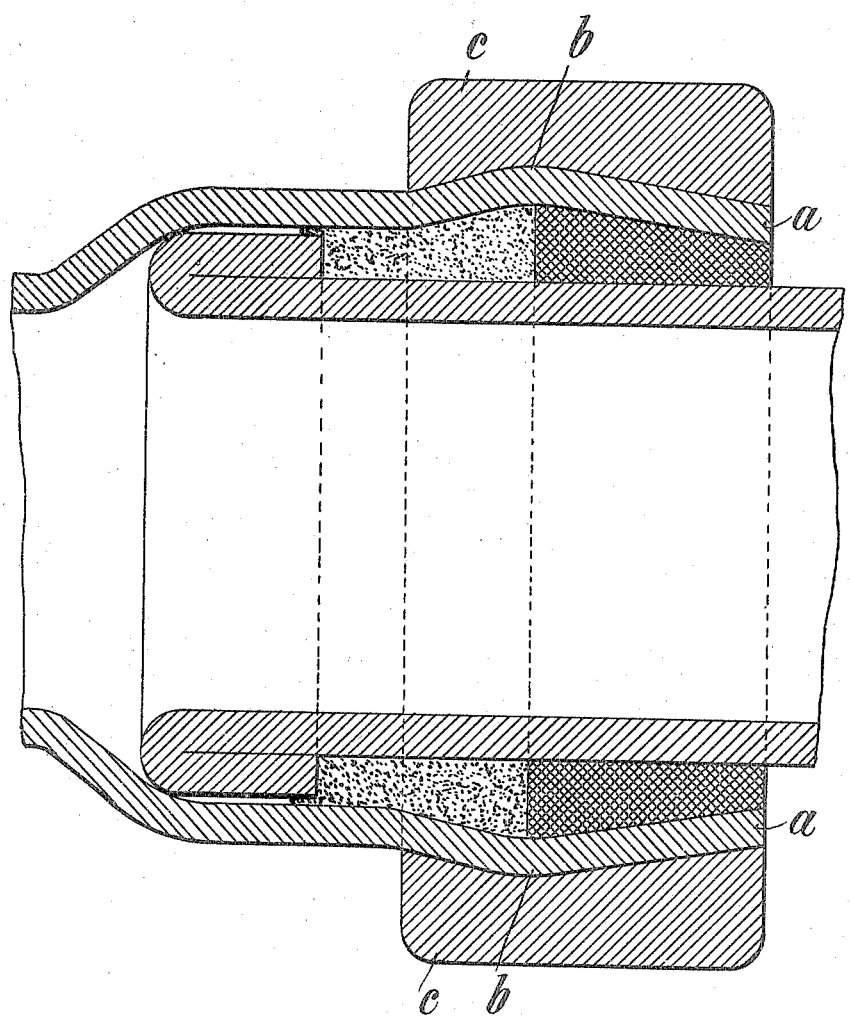

JOSEPH GRADL, OF GELSENKIRCHEN, GERMANY.

BELL-END PIPE.

1,249,743. Specification of Letters Patent. Patented Dec. 11, 1917.

Application filed June 3, 1915. Serial No. 32,027.

*To all whom it may concern:*

Be it known that I, JOSEPH GRADL, a subject of the Emperor of Germany, and residing at Gelsenkirchen, Germany, have invented a certain new and useful Improvement in Bell-End Pipes, of which the following is a specification.

My invention relates to bell end pipes and the object of my invention is to provide the bell end of the pipe with a reinforcement of novel and improved construction.

The single figure is a longitudinal section through a bell and spigot pipe joint, showing my invention illustratively embodied in the bell end pipe.

Various methods of strengthening the bell end of a pipe have already been proposed; for example wide rings covering the entire bell have been drawn on the latter, while hot. These however increase the weight of the pipe to an objectionable extent. Moreover, this wide reinforcing ring is swaged on the bell by means of rolls and it is practically impossible to prevent the ring from being spread beyond the area of the bell under the pressure of these rolls. As a consequence it frequently happens that the ring does not bear against all portions of the bell and the moisture present in the earth finds its way through these recesses and cause corrosion.

Again, it has been proposed to shrink reinforcing rings on the bell end of the pipe; but by reason of the sharp inclination of the walls of the bell the rings work loose and can be held tight upon the bell only by forging the same in place. This method is therefore time-consuming and expensive. Furthermore, where reinforcing rings of this character are employed the bell cone must be too greatly elongated to avoid steep pitch and its interior affords too small and unsatisfactory a chamber for the reception of the packing.

Other forms have been suggested according to which the periphery of the bell is provided with teeth or the like which engage the reinforcing ring. But these teeth weaken the walls of the bell and moreover under working conditions are impracticable and expensive.

According to the present invention an extremely certain and very simply accomplished union between the bell and its reinforcing ring is secured, through an outward bowing or bellying of the conical wall of the bell and a corresponding recessing of the reinforcing ring to fit thereon. For example, the outward bowing of the bell $a$ may take the form of a double cone $b$ while the inner periphery of the reinforcing ring $c$ is correspondingly shaped. With this arrangement the bell end may be made as short as desired and its conicity consequently of sharp incline, without danger that the reinforcing ring will shrink loose during adjustment or subsequently work loose of its own accord. The ring is adjusted hot on the bell end, which has been previously given the desired shape in the forming rolls. In its heated condition the ring is of slightly greater diameter than the greatest diameter of the double cone $b$ of the bell and consequently may be passed thereon. On cooling however, the ring shrinks directly upon the double cone $b$ and since it shrinks equally in all radial directions, it forms a rigid reinforcement undetachable from the bell end. Furthermore, this construction results in a double coned packing chamber, the constricted outer end of which prevents the escape of the packing for the joint.

Obviously more than a single outward bowing $b$ of the bell end may be employed, and a corresponding plurality of reinforcing rings $c$ employed to coöperate therewith.

It is to be understood that the construction shown is but an illustrative embodiment of my invention and that the parts may be variously shaped to accomplish what I claim as my invention.

I claim as my invention:—

1. A bell end pipe having in the bell area an exterior annulus of double-cone shape, in combination with a reinforcing ring having its inner periphery shaped to the contour of said annulus and hot shrunk thereon.

2. A bell end pipe having in the bell area an annulus of double-cone shape on both exterior and interior surfaces of the bell, in combination with a reinforcing ring having its inner periphery shaped to the contour of the exterior annulus and hot shrunk thereon.

3. A bell end pipe having in the bell area an exterior annulus of double cone shape, and a reinforcing ring having its inner periphery shaped to the contour of said annulus and hot shrunk thereon, both pipe end and reinforcing ring being independently shaped in advance of their assembly, and the pipe end being cold when the ring is shrunk thereon.

4. A bell end pipe having in the bell area an exterior annulus of double cone shape, and a reinforcing ring of greater thickness than the pipe having its inner periphery shaped to the contour of said annulus and hot shrunk thereon while the pipe is cold.

5. A bell end pipe having at the outer extreme of the bell area an exterior annulus of double cone shape, in combination with a reinforcing ring having its inner periphery shaped to the contour of said annulus and hot shrunk thereon.

6. A bell end pipe having the outer extreme of the bell area shaped as a double cone of relatively high pitch in combination with a reinforcing ring hot shrunk on said double-coned area of the bell and having its inner face shaped to the contour thereof.

7. A bell end pipe having the outer extreme of the bell area shaped as a double cone, the inner portion of which has a sharper pitch than the outer portion thereof, in combination with a reinforcing ring hot shrunk on said double-coned area and having its inner face shaped to the contour thereof.

In testimony whereof I have signed my name to this specification, in the presence of two subscribing witnesses.

JOSEPH GRADL. [L. S.]

Witnesses:
HELEN NUFER,
JOSEF BOCKMANN.

Copies of this patent may be obtained for five cents each, by addressing the "Commissioner of Patents, Washington, D. C."